*(12)* United States Patent
Pasternak (10) Patent No.: US 9,016,622 B1
(45) Date of Patent: Apr. 28, 2015

(54) FLIGHT SYSTEM FOR A CONSTANT VOLUME, VARIABLE BUOYANCY AIR VEHICLE

(76) Inventor: Igor Pasternak, Los Angeles, CA (US)

( * ) Notice: Subject to any disclaimer, the term of this patent is extended or adjusted under 35 U.S.C. 154(b) by 421 days.

(21) Appl. No.: 13/415,182

(22) Filed: Mar. 8, 2012

(51) Int. Cl.
*B64B 1/00* (2006.01)
*B64B 1/62* (2006.01)

(52) U.S. Cl.
CPC .................................... *B64B 1/62* (2013.01)

(58) Field of Classification Search
CPC ......................................................... B64B 1/62
See application file for complete search history.

(56) References Cited

U.S. PATENT DOCUMENTS

| | | | |
|---|---|---|---|
| 5,645,248 A * | 7/1997 | Campbell | 244/30 |
| 5,823,468 A | 10/1998 | Bothe | |
| 6,196,498 B1 | 3/2001 | Eichstedt et al. | |
| 6,293,493 B1 | 9/2001 | Eichstedt et al. | |
| 2005/0156082 A1 * | 7/2005 | Eberle et al. | 244/96 |
| 2005/0236519 A1 * | 10/2005 | Handley | 244/97 |
| 2008/0265086 A1 * | 10/2008 | Lee | 244/30 |
| 2009/0114767 A1 * | 5/2009 | Alavi | 244/97 |
| 2009/0189015 A1 * | 7/2009 | Alavi | 244/97 |

\* cited by examiner

*Primary Examiner* — Brian M O'Hara
(74) *Attorney, Agent, or Firm* — Cislo & Thomas, LLP (57) ABSTRACT

A system for providing lift to an air vehicle with vertical takeoff and landing capabilities comprising an aerodynamically enhanced hull filled with lighter-than-air gas. The vehicle is equipped with a system to compress and store the lighter-than-air gas. The present invention system keeps the volume of the lighter-than-air gas near to constant during all phases of flight. The present invention system also adjusts the vehicle's buoyancy during payload/cargo loading and unloading operations.

16 Claims, 8 Drawing Sheets

FLIGHT SYSTEM FOR A CONSTANT VOLUME, VARIABLE BUOYANCY AIR VEHICLE

BACKGROUND OF THE INVENTION

1. Field of the Invention

The invention relates generally to the flight system for a constant volume, variable buoyancy air vehicle able to achieve vertical takeoff and landing utilizing lighter-than-air static lift principals and achieving forward flight by utilizing heavier-than-air dynamic lift principals. More particularly, this invention relates to a flight system combining an aerodynamically efficient hull filled with lifting gas and incorporating a system for controlling the pressure of a lifting gas in a constant volume envelope and the ability to adjust buoyancy by actively compressing or decompressing the lifting gas, with the resulting pressure differential being borne essentially by an internal pressure tank.

2. Background of the Invention

There are two types of air vehicles currently operating that use lighter-than-air gases for lift: conventional airships that use primarily static lift and hybrid airships that combine static lift and aerodynamic lift. Both vehicle types are based on a variable volume of lighter-than-air gases design that depends upon using ballonets (internal air cells inside of the envelope).

Figure 3:
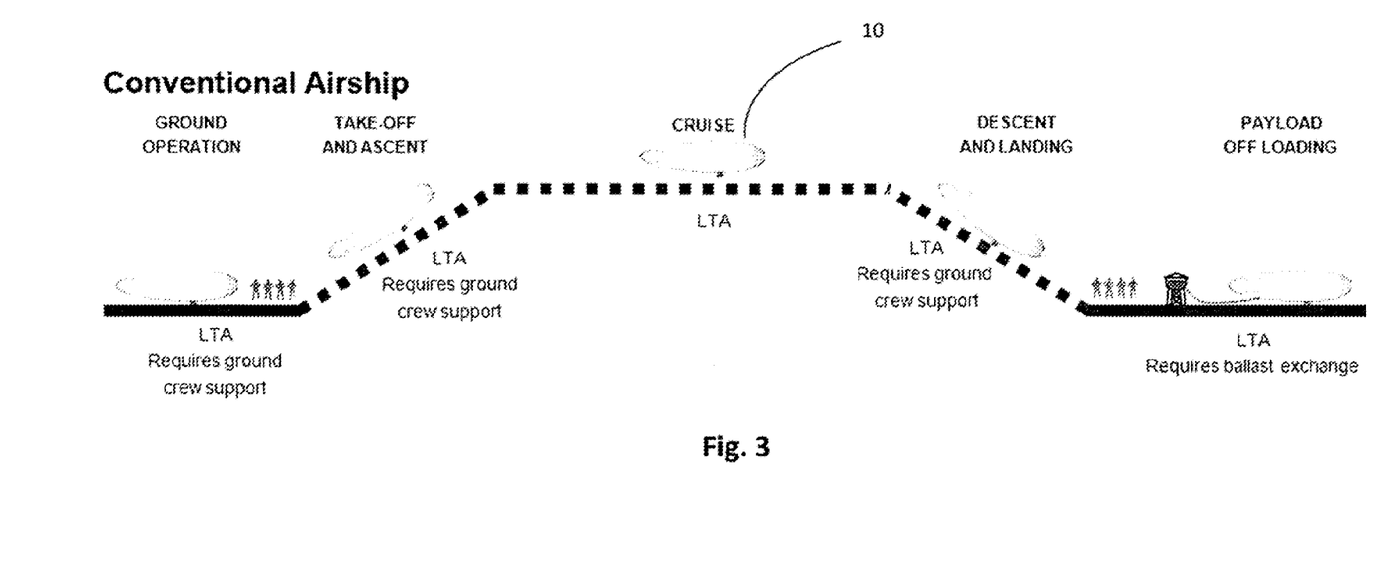
FIG. 3 is a schematic diagram showing the flight stages and ground crew requirements of a prior art conventional aircraft.

Referring to FIG. 3, conventional airships use lighter-than-air gases such as helium to create positive lift. Such airships are always lighter-than-air and require ground crews and equipment to assist during takeoff and landing. The ground crews must also supply and remove ballast, such as sand or water to compensate for payload/cargo weight. Such airships are altitude limited because of pressure height limitations established by the size of the ballonets contained within the airship.

Figure 4:
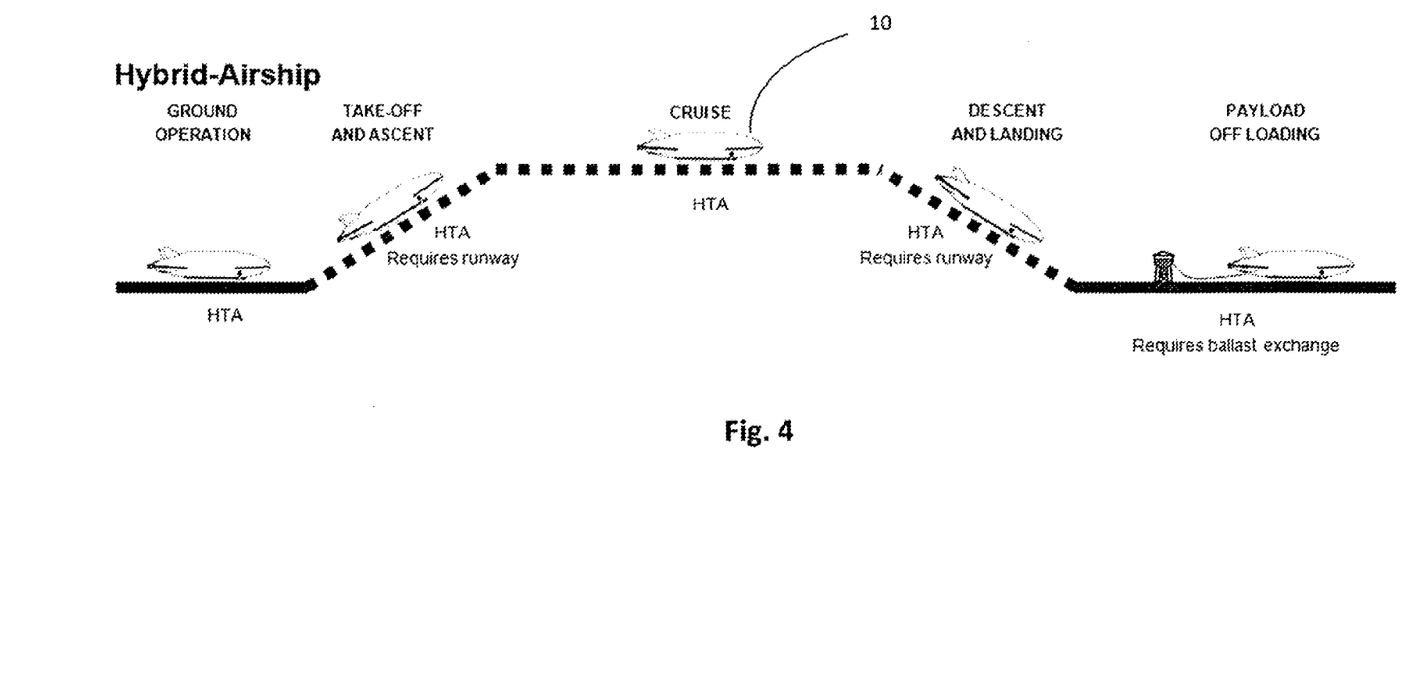
FIG. 4 is a schematic diagram showing the flight stages and ground crew requirements of a prior art hybrid aircraft.

Referring to FIG. 4, hybrid airships are always statically heavy. They are either shaped as lifting bodies or equipped with lifting devices. Such vehicles typically possess wings to generate aerodynamic lift. Aerodynamic lift allows the hybrid airship to take off when statically heavy. An airship that remains persistently statically heavy compensates for weight loss due to fuel burn and cargo offloading. Statically heavy airships can also eliminate the ground crews/equipment needed by conventional airships. However, hybrid airships require runways for takeoff and landing.

Figure 6:
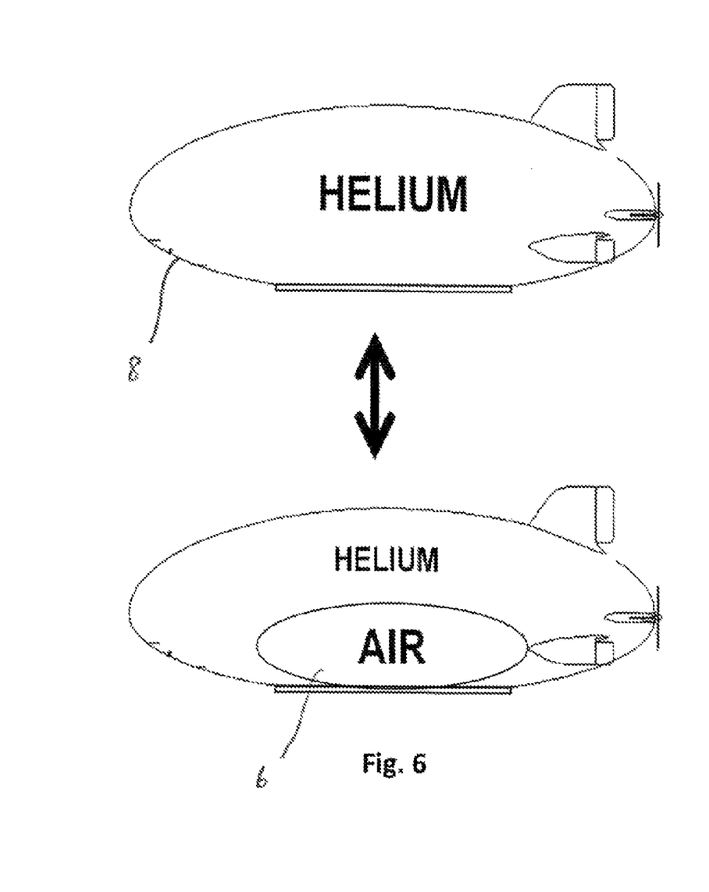
FIG. 6 shows the operation of a prior art ballonet equipped aircraft during vertical lift.
Figure 7:
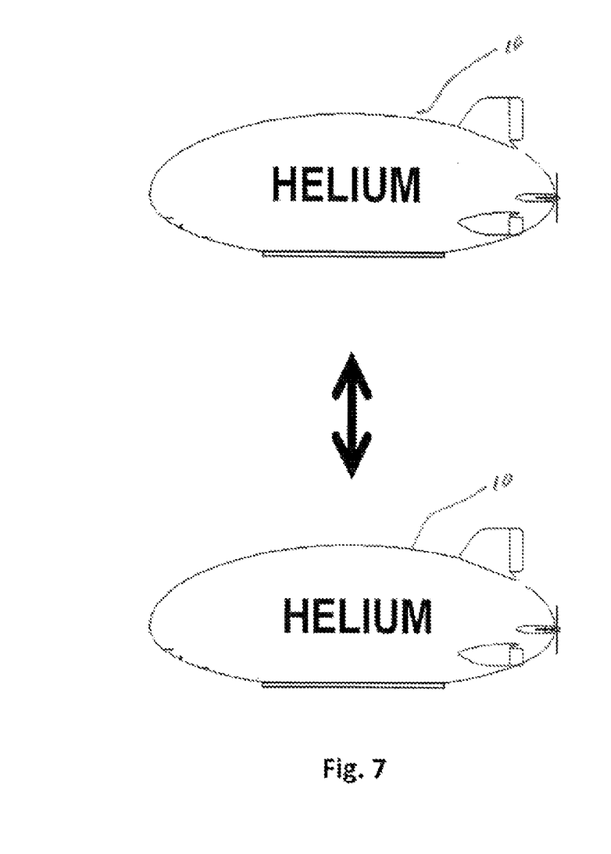
FIG. 7 shows the operation of an aircraft of the present invention during vertical lift.

Both conventional airships and hybrid airships require the use of one or more ballonets. Ballonets are required because variables such as temperature, altitude, density, superheat and atmospheric pressure all affect the state of the lifting gas inside the hull of the airship during flight. These variables cause the lifting gas to either contract or expand. For example, as the airship climbs during flight the atmospheric pressure decreases and the lifting gas inside the envelope expands, thereby increasing the internal hull pressure. As the airship descends, the reverse occurs: atmospheric pressure increases and the lifting gas inside of the hull contracts. Ballonets equipped with blowers and air valves are used to adapt to the pressure changes caused by expanding and contracting lifting gas within the airship. Ballonets are bags inside the envelope into which air is either forced in or out. Referring to FIG. 6, the ballonet 6 is primarily used in flight to control hull pressure during ascent and descent. Ballonets are also used to counter variations in lifting gas volume that occur as a result of diurnal temperature changes and weather pattern movements. Once the ballonets are emptied, the airship is said to be at pressure height 8. Once at pressure height the airship cannot climb any higher without releasing lifting gas from the hull. Referring to FIG. 7, an aircraft 10 using a volume compensation system other than a ballonet may have a dramatically increased pressure height 8.

Conventional airships and hybrid airships are not presently used for cargo transportation for a number of reasons. Ballonets limit the vehicle's operational altitude. Ballonets also increase the total vehicle size which in turn leads to larger and less manageable vehicles. Conventional and hybrid airships require ballast such as sand or water, which makes cargo offloading more difficult. Supplying ballast requires large ground crews and ground handling infrastructures. Hybrid airships require oversized runways to accommodate the vehicle size and are not able to perform vertical takeoff or landing.

In order to overcome the limitations of conventional and hybrid airships, it would be desirable to control the lifting gas volume within an aircraft, at least during cruise conditions, by maintaining the lifting gas at constant volume. Such a system would reduce the need for ballonets or at least minimize their undesirable effect of limiting the pressure height of such an aircraft.

Today, pilots of conventional and hybrid airships have little control over the buoyancy of the aircraft. Typically, they can either dump ballast to increase static lift or release the lifting gas to decrease static lift. Various systems for buoyancy control have been discussed in the art, and in particular, systems for compressing and releasing helium from a pressure tank onboard an airship have been discussed. None of these designs have come to fruition however, i.e. they remain merely theoretical concepts that have not and likely never will become actual flying aircraft.

Moreover, those prior art helium compression systems that have been suggested advise the use of high pressure helium pumps to control the flow of helium within the airship. High pressure helium compression systems have substantial disadvantages and, in particular, are too heavy and too slow to respond to changing volume conditions within the airship. In addition, they require heavy active cooling systems to keep the helium gas at a useable temperature.

Therefore, there remains a need in the art for a system of compressing and decompressing a lifting gas in a buoyant aircraft for the purpose of maintaining buoyancy control that is relatively lightweight and can respond quickly to changes in the lifting gas volume.

SUMMARY OF THE INVENTION

The present invention solves the problems of the prior art by providing a buoyant aircraft which includes a hull in the form of an aerodynamic lifting body or includes other aerodynamic lifting devices such as wings, winglets, rotors or vectored thrust engines, and an effective lifting gas compression and release system that is lightweight and is capable of quickly responding to changes in the lifting gas volume in the buoyant aircraft's hull. Contrary to the teachings of the prior art, an effective lifting gas compression system suitable for use in a buoyant aircraft needs to be a low pressure system. A low pressure system is required because only a low pressure system can compress lifting gas at high speed and in sufficiently large volumes for practical use. The prior art compression systems all relied on high pressure (i.e. greater than 250 p.s.i.) These high pressure prior art systems are impractical because they require more power and therefore lead to much heavier power generators and/or batteries, and heavier compressors, pressure tanks, and associated equipment. The prior art also compresses much more slowly. The instant invention greatly improves upon the prior art by creating a low pressure (i.e. less than 250 p.s.i.) compression system. The low pressure compression system allows for lighter materials and faster compression.

Figure 5:
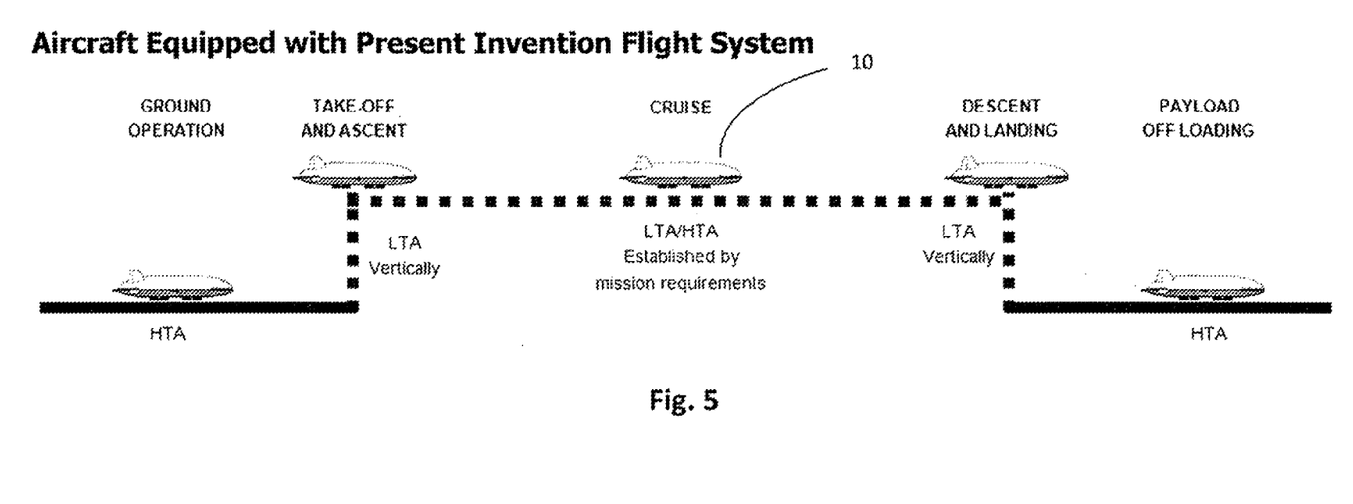
FIG. 5 is a schematic diagram showing the flight stages and ground crew requirements of an aircraft in accordance with the present invention.

The compression system used in the present invention aircraft, termed "COSH" is just such a low pressure system which meets the aforementioned requirements. Among the advantages of the buoyant aircraft of the present invention is its ability to maintain the volume of lifting gas at near to constant during all phases of flight and control static lift during loading and offloading operations without using ballast or venting of the lifting gas. As shown in FIG. 5, the aircraft of the present invention is able to ascend and descend in a true vertical manner. This is quite unlike the flight regimen of a hybrid airship which requires a take-off run (see FIG. 4) or a conventional airship which still requires dump ballast to achieve vertical takeoff or release lifting gas to achieve vertical landing.

It is an object of the aircraft of the present invention to:
Control lift in all stages of air and ground operations without taking on external ballast or venting of the lifting gas;
Operate without ground support infrastructure and from unimproved landing sites;
Vertically take off, land, and hover;
Achieve greater operational altitude and speed compared to the prior art; and
Reduce the size of the vehicle hull compared to the prior art.

DETAILED DESCRIPTION OF THE PREFERRED EMBODIMENTS

Figure 1:
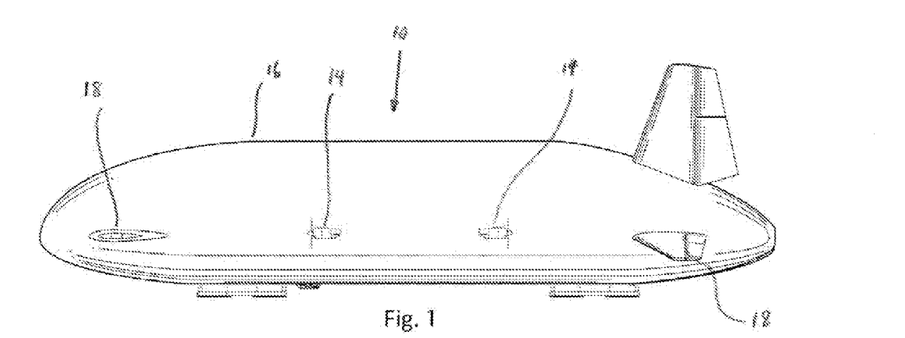
FIG. 1 is a side view of an exemplary aircraft incorporating the features of the present invention.
Figure 2:
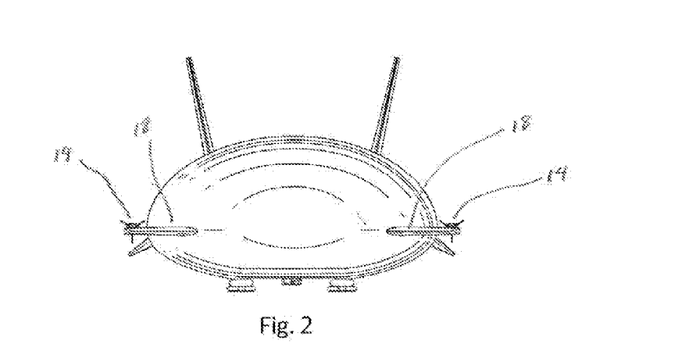
FIG. 2 is a front view of the exemplary aircraft of FIG. 1 incorporating the features of the present invention.

Referring now to FIGS. 1-2, an exemplary embodiment of the present invention aircraft 10 will now be described with reference to the accompanying drawings. The aircraft 10 is preferably an aerodynamically shaped constant volume variable buoyancy air vehicle equipped with a lifting gas compression and release system referred to as the Control of Static Heaviness or "COSH" system 12 (shown in FIGS. 9 and 10). The aircraft 10 is preferably equipped with vectored thrust engines 14 for producing positive or negative lift. The body 16 of the aircraft 10 is preferably an aerodynamic lifting body or is equipped with lift generating surfaces 18.

The present invention aircraft improves upon the prior art by allowing an aircraft to maintain a constant volume, as opposed to conventional and hybrid airships that use ballonets to compensate for change in the volume of lifting gas or vent the lifting gas during flight operations. In the aircraft of the present invention, a lifting gas such as helium is compressed and stored in pressure tanks. For an increase in static lift, the lifting gas is released into the main envelope. For a decrease in static lift, the lifting gas is compressed back into the pressure tanks. As the vehicle rises, the surrounding air drops in pressure. Due to decreased air density, the lifting gas expands as the vehicle rises. To keep the total volume of lifting gas in the vehicle constant, the lifting gas is compressed into pressure tanks during ascent and released into the hull during descent. Compressing lifting gas during ascent causes the vehicle to lose static lift. The aircraft of the present invention compensates for this loss of static lift by generating aerodynamic lift from the vehicle's aerodynamically shaped hull and/or other aerodynamic lifting devices such as wings or winglets and/or vectored thrust engines.

Flight Regime for the Aircraft of the Present Invention

Figure 8:
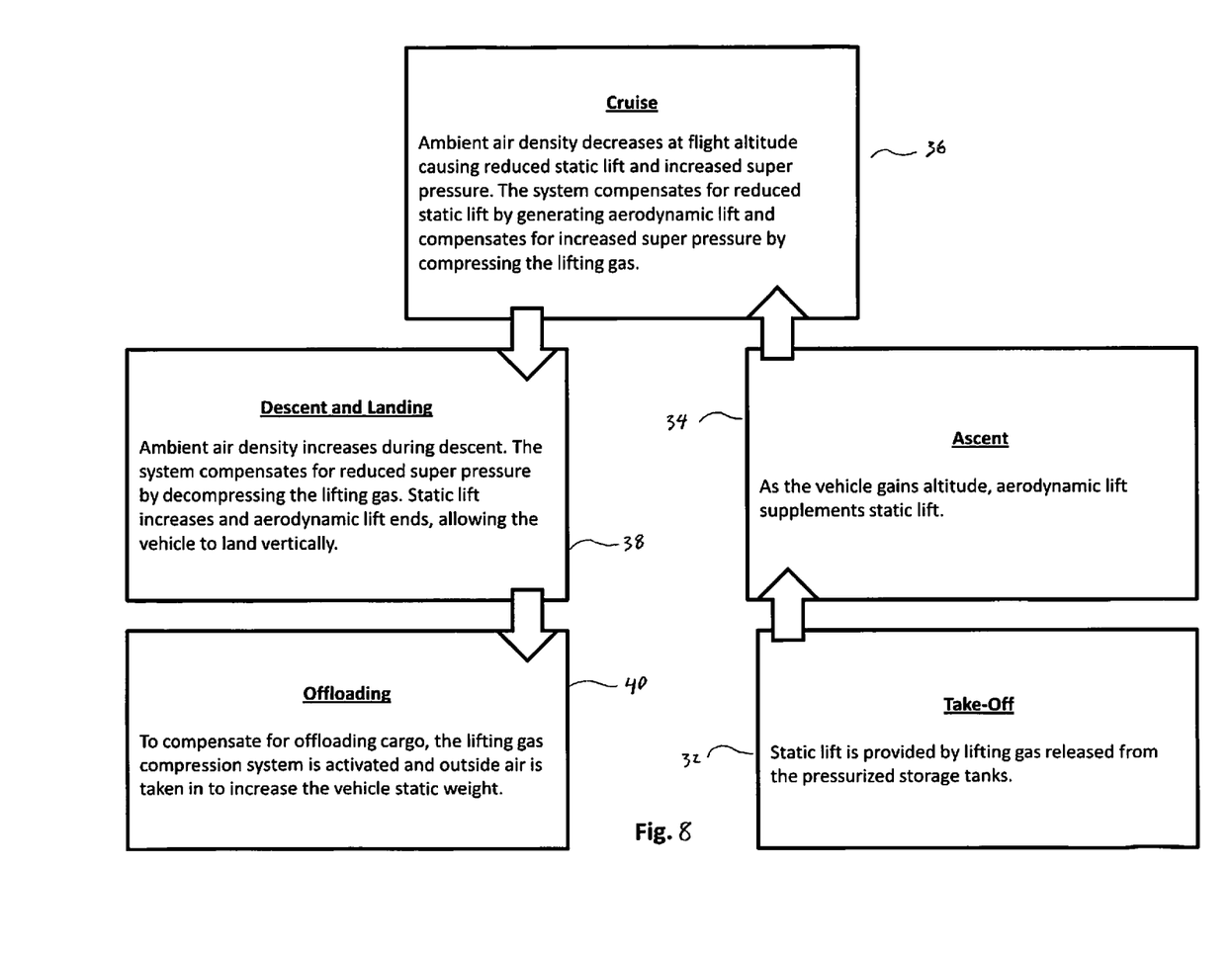
FIG. 8 depicts a flow chart showing the flight stages of the present invention aircraft.

With reference to FIG. 8, the flight regime for the present invention is as follows: In step 32, i.e. Take-Off: during take-off, the COSH system releases compressed lifting gas from the pressurized storage tanks to the main envelope. The buoyancy supplied by the lifting gas provides upward force and the vehicle takes off vertically.

With reference to step 34, i.e. Gaining Altitude: during ascent, the present invention vehicle climbs to its normal cruise altitude while maintaining a constant volume. As the vehicle gains altitude, aerodynamic lift generated by the external body shape and/or aerodynamic lifting devices supplements buoyant lift.

With reference to step 36, i.e. Flight: as the vehicle rises, the decrease in ambient air density causes the lifting gas to provide less static lift and increases the super pressure in the main compartment. To adjust, the lifting gas compression or COSH system activates and compresses the lifting gas into storage tanks. The aerodynamic lift generated by the external body shape and/or aerodynamic lifting devices compensates for the loss of static lift.

With reference to step 38, i.e. Descent and Landing: as the vehicle descends, the ambient atmospheric pressure increases. Simultaneously, compressed lifting gas from the storage tanks vents to the main compartment. The static lift increases as altitude decreases and the airspeed and aerodynamic lift can be reduced to zero. This allows the vehicle to land vertically.

With reference to step 40, i.e. Offloading: as payload is offloaded the lifting gas compression system (i.e. the COSH system) is activated. The compressed lifting gas is forced into the pressurized storage tanks, reducing the lifting gas volume of the main compartment. At the same time, outside air is taken in to increase the vehicle's static weight.

The COSH System

Figure 9:
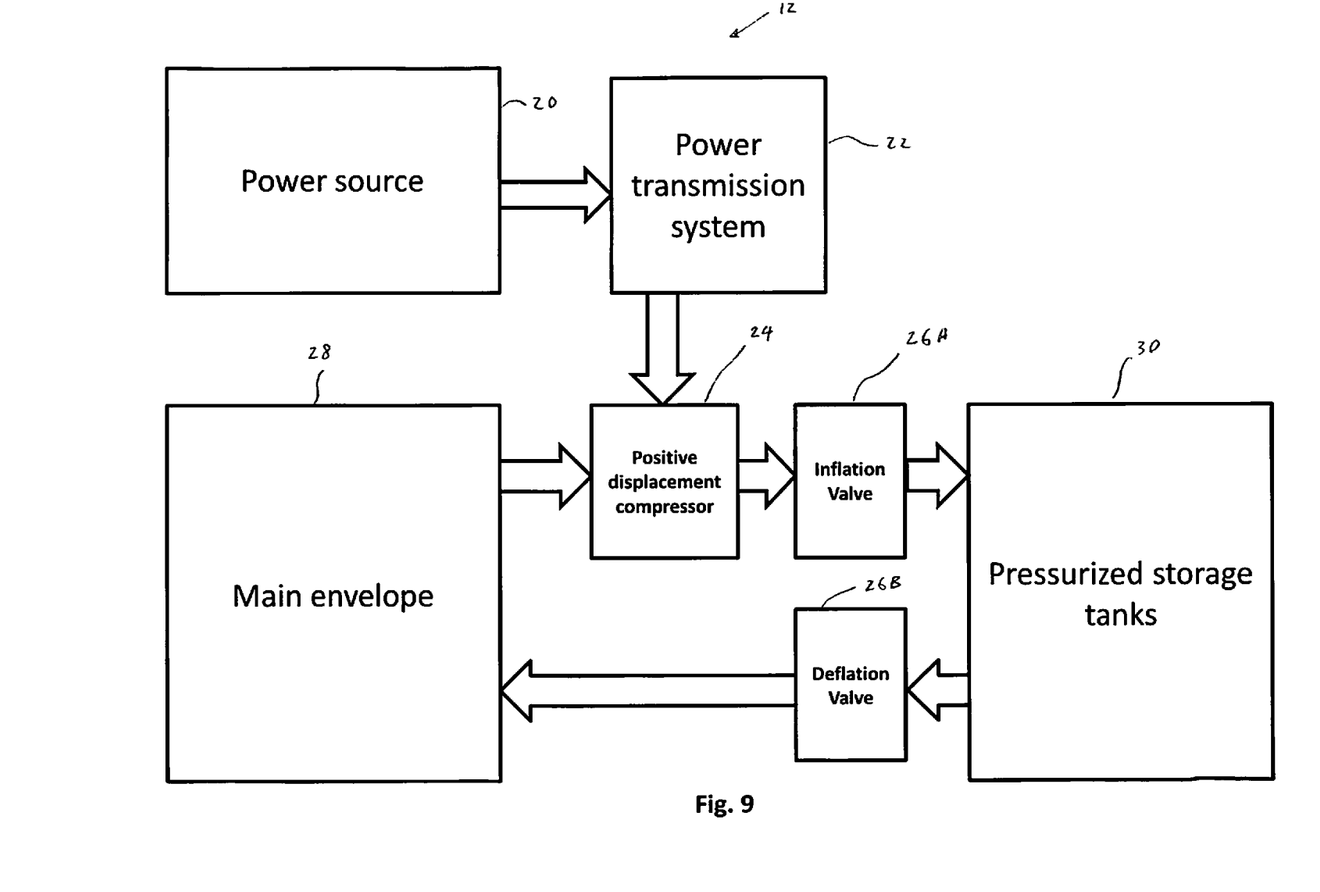
FIG. 9 depicts a block diagram showing the operation of the helium compression or control of static heaviness system of the present invention aircraft.

Referring now to FIG. 9, the COSH system comprises a power source 20 and a power transmission system 22, gas compressors 24, inlet and outlet valves 26, a main envelope 28, and pressurized lifting gas storage tanks 30. While helium is the lifting gas used in the exemplary embodiment, other lifting gases such as hydrogen may be used.

The present embodiment power transmission system 22 transfers power from the power source 20 to the helium compressors 24 (and other areas such as the propellers). The power transmission system 22 also enables energy converters such as electrical generators and propellers to engage and disengage from the power source 20 as necessary.

The compressors 24 are used to compress helium in order to adjust buoyancy or keep constant the volume of lifting gas. In the exemplary embodiment, the power source 20 for the compressors 24 is an engine. However, other forms of power generation may be utilized. The exemplary embodiment uses screw type compressors 24 to compress large volumes of helium at low pressure at very high speeds. However, other types of compressors may be used, such as reciprocating compressors, rotary centrifugal compressors, or rotary vane, scroll compressors.

The COSH system 12 uses a low deferential pressure in the helium tanks 30 to minimize the compression time and lower the compressor's power requirements. Pressurization tanks 30 store the compressed helium. When the differential pressure (the pressure difference between the inside and outside of the body of the aircraft) exceeds the operational range of the flight system (the operational range of the flight system varies with the outside atmosphere), the lifting gas compression system 12 is activated to compress the lifting gas into pressurization tanks 30. When the differential pressure becomes lower than the operational range of the system, deflation valves release compressed lifting gas into the main envelope. These pressurization tanks are shaped cylindrically. However, various other shapes can be used, including spheres.

Inlet and outlet valves 26 are used to maintain the pressure of helium in each of the pressurization tanks 30. The valves 26 perform two functions: inflation and deflation. The Inflation valve 26A accepts compressed helium from the compressor 24 and stores the pressurized gas in the storage tanks 30. The Inflation valve 26A includes a check valve to ensure that the helium remains in the storage tanks 30 without leaking back into the main helium compartment 28. The deflation valve 26B releases the compressed helium into the main envelope 28.

The mass of the pressurization tanks for the given amount of the gas to be compressed does not depend on the differential pressure of the gas, but depends only on the pressure of the environment outside the tank, the density and tensile properties of the material. Therefore, using low pressure, i.e. pressurization tanks 30 and low pressure compressors 24, is more efficient and leads to the following advantages: (1) the low pressure compressor 24 is lighter in weight and requires less power than higher pressure compressors; (2) gas compression time is substantially shorter because of the use of lower pressure compressors; and, (3) the elimination of gas cooling devices which are typically required when compressing gas to a higher pressure.

Analysis for Pressure Tanks Suitable for Use in the Helium Compression System of the Present Invention Aircraft Prior art proposals for helium compression systems depended upon the use of high pressure compression of the helium. Such systems however, have never been built and would likely prove too heavy and too slow in compressing and decompressing the gas to maintain a constant volume of helium in the aircraft or compensate for payload and cargo unloading. The inventors of the COSH system recognized these defects in the prior art. Upon studying the problem, they recognized that the key to building a workable compression system required discovery that the mass of the pressurization tank 30 was first, independent of the tank differential pressure, and second, depended solely upon the pressure of the environment outside the tank, and the density and tensile properties for the material from which the tank is formed. In reaching this conclusion, the inventors conducted the following analysis:

For a Cylindrical Pressure Tank

The mass of the cylindrical pressure tank is defined by:

$$M_{vessel} = \rho_{vessel} 2\pi r t L \quad \text{(equation 1.1)}$$

Where:

$\rho_{vessel}$=density of the material r=radius of the cylinder t=thickness of the material L=length of the cylinder The mass of the compressed gas inside the cylindrical pressure tank is defined by:

$$M_{gas} = \rho_{gas} \pi r^2 L \quad \text{(equation 2.1)}$$

From the ideal gas equation follows:

$$\rho_{gas} = \frac{P_{gas}}{RT} \quad \text{(equation 3.1)}$$

Where:

$P_{gas}$=gas pressure

R=universal gas constant

T=Temperature

Requirements for tensile properties of the material from which the cylindrical tank is formed:

$$\sigma = \frac{\Delta p * r}{t} \quad (4.1)$$

Where:

$\Delta p$=differential pressure

From equation 1.1 and equation 2, consider following ratio:

$$\frac{M_{vessel}}{M_{gas}} = \frac{\rho_{vessel} 2\pi r t L}{\rho_{gas} \pi r^2 L}$$

Using the definition of the requirements for tensile properties, equation 4.1, and ideal gas equation 3.1, the above formula modifies into following expression:

$$\frac{M_{vessel}}{M_{gas}} = 2RT\rho_{vessel} \frac{t}{rP_{gas}} = 2RT\rho_{vessel} \frac{1}{\sigma + \frac{P_{0.gas} r}{t}}$$

Where:

$P_{gas}$=pressure of the compressed gas $P_{0.gas}$=pressure of the uncompressed gas Term $\frac{P_{0.gas}r}{t} \ll \sigma$, then $\frac{M_{vessel}}{M_{gas}} = 2RT\rho_{vessel}\frac{1}{\sigma}$ (5.1)

The mass of the compressed gas inside the tank and uncompressed gas is the same:

$$V_{vessel}\rho_{c.gas} = V_0\rho_{0.gas} \quad (6.1)$$

Where:
$V_{vessel}$=volume of the compressed gas
$\rho_{c.gas}$=density of compressed gas
$V_0$=volume of uncompressed gas
$\rho_{0.gas}$=density of the uncompressed gas Using equation 6.1 and assuming that the process is isothermal, equation 5.1 becomes $$\frac{M_{vessel}}{V_0\rho_{0.gas}} = 2RT\rho_{vessel}\frac{1}{\sigma} \Rightarrow \frac{M_{vessel}}{V_0} = \quad (7.1)$$

$$2RT\rho_{0.gas}\frac{\rho_{vessel}}{\sigma} \Rightarrow \frac{M_{vessel}}{V_0} = 2P_{0.gas}\frac{\rho_{vessel}}{\sigma},$$

where $P_{0.gas}$=pressure of the environment outside the tank.

Spherical Pressure Tank

Analogously we can repeat the above argument for the spherical tank. Mass of spherical pressure tank:

$$M_{vessel} = \rho_{vessel}4\pi r^2 t \quad \text{(equation 1.2)}$$

Where:
$\rho_{vessel}$=density of the material
r=radius of the sphere
t=thickness of the material Mass of the gas inside the tank:

$$M_{gas} = \rho_{gas}\frac{4}{3}\pi r^3 \quad \text{(equation 2.2)}$$

From the ideal gas equation follows:

$$\rho_{gas} = \frac{P_{gas}}{RT} \quad \text{(equation 3.2)}$$

Where:
$P_{gas}$=gas pressure
R=universal gas constant
T=temperature

Requirements for tensile properties for the spherical pressure tank:

$$\sigma = \frac{\Delta p * r}{2t} \quad \text{(equation 4.2)}$$

Where:
$\Delta p$=differential pressure

From equation 1.2 and equation 2.2, consider following ratio:

$$\frac{M_{vessel}}{M_{gas}} = \frac{\rho_{vessel}4\pi r^2 t}{\rho_{gas}\frac{4}{3}\pi r^3}$$

Using equation 3.2 and equation 4.2

$$\frac{M_{vessel}}{M_{gas}} = 3RT\rho_{vessel}\frac{t}{rP_{gas}} = 3RT\rho_{vessel}\frac{1}{2\sigma + \frac{P_{0.gas}r}{t}}$$

Where:
$P_{gas}$=pressure of the compressed gas
$P_{0.gas}$=pressure of the uncompressed gas Term $\frac{P_{0.gas}r}{t} \ll \sigma$, then $\frac{M_{vessel}}{M_{gas}} = \frac{3}{2}RT\rho_{vessel}\frac{1}{\sigma}$ (equation 5.2)

Mass of the gas is conservative:

$$V_{vessel}\rho_{c.gas} = V_0\rho_{0.gas} \quad \text{(equation 6.2)}$$

Where:
$V_{vessel}$=volume of the compressed gas
$\rho_{c.gas}$=density of compressed gas
$V_0$=volume of uncompressed gas
$\rho_{0.gas}$=density of the uncompressed gas Using equation (6.2) equation (5.2) becomes and assuming that the process is isothermal $$\frac{M_{vessel}}{V_0\rho_{0.gas}} = \frac{3}{2}RT\rho_{vessel}\frac{1}{\sigma} \Rightarrow \frac{M_{vessel}}{V_0} = \quad (7.2)$$

$$\frac{3}{2}RT\rho_{0.gas}\frac{\rho_{vessel}}{\sigma} \Rightarrow \frac{M_{vessel}}{V_0} = \frac{3}{2}P_{0.gas}\frac{\rho_{vessel}}{\sigma},$$

where $P_{0.gas}$=pressure of the environment outside the tank.

From equation 7.1 and equation 7.2 for cylindrical tank $$\frac{M_{vessel}}{V_0} = 2k$$

and for spherical tank $$\frac{M_{vessel}}{V_0} = \frac{3}{2}k$$

Where, $$k = P_{0.gas}\frac{\rho_{vessel}}{\sigma}$$

Therefore, when the pressure tank is shaped as a body of revolution, the following will be true $$\frac{M_{vessel}}{V_0} = ak, \quad \text{(equation 8)}$$

where "a" is a coefficient that depends on the geometry of the pressure tank.

From equation 8, the mass of the pressure tank for the given amount of the gas to be compressed does not depend on the differential pressure of the gas, but depends only on the pressure of the environment outside the tank, material density and tensile properties. Therefore, using low pressure tanks and compressors is more efficient and leads to the following advantages: (1) a low pressure compressor is lighter in weight and requires less power than a high pressure compressor; (2) usage of a low pressure compressor allows for a significantly shorter gas compression time vis-à-vis, a high pressure compressor; and, (3) usage of a low pressure compressor leads to elimination of the need for gas cooling devices required in the case of high pressure gas compression.

ADVANTAGES OF THE PRESENT INVENTION

The present invention combines a Control of Static Heaviness ("COSH") system with an aerodynamically shaped hull and/or other aerodynamic lifting devices such as wings, rotors or vectored thrust engines. The advantage of the present invention is that a buoyant air vehicle equipped with the present invention is able to keep the volume of lifting gas at near to constant during all phases of flight and control static lift during loading and offloading operations without using ballast or venting the lifting gas. COSH is the lifting gas compression and storage system component of the present invention. With reference to FIG. 5, the aircraft of the present invention is equipped with COSH and/or vectored thrust engines, an aerodynamically shaped hull and/or aerodynamic lifting devices enables the buoyant air vehicle to take off and land vertically at maximum payload capacity, hover, and remain heavier-than-air throughout payload load and unload cycles, as well as compensate for fuel burn, atmospheric conditions, and cargo offloading without external ballasting. These capabilities make buoyant air vehicles equipped with the COSH system of the present invention more useful than conventional or hybrid airships.

Figure 10:
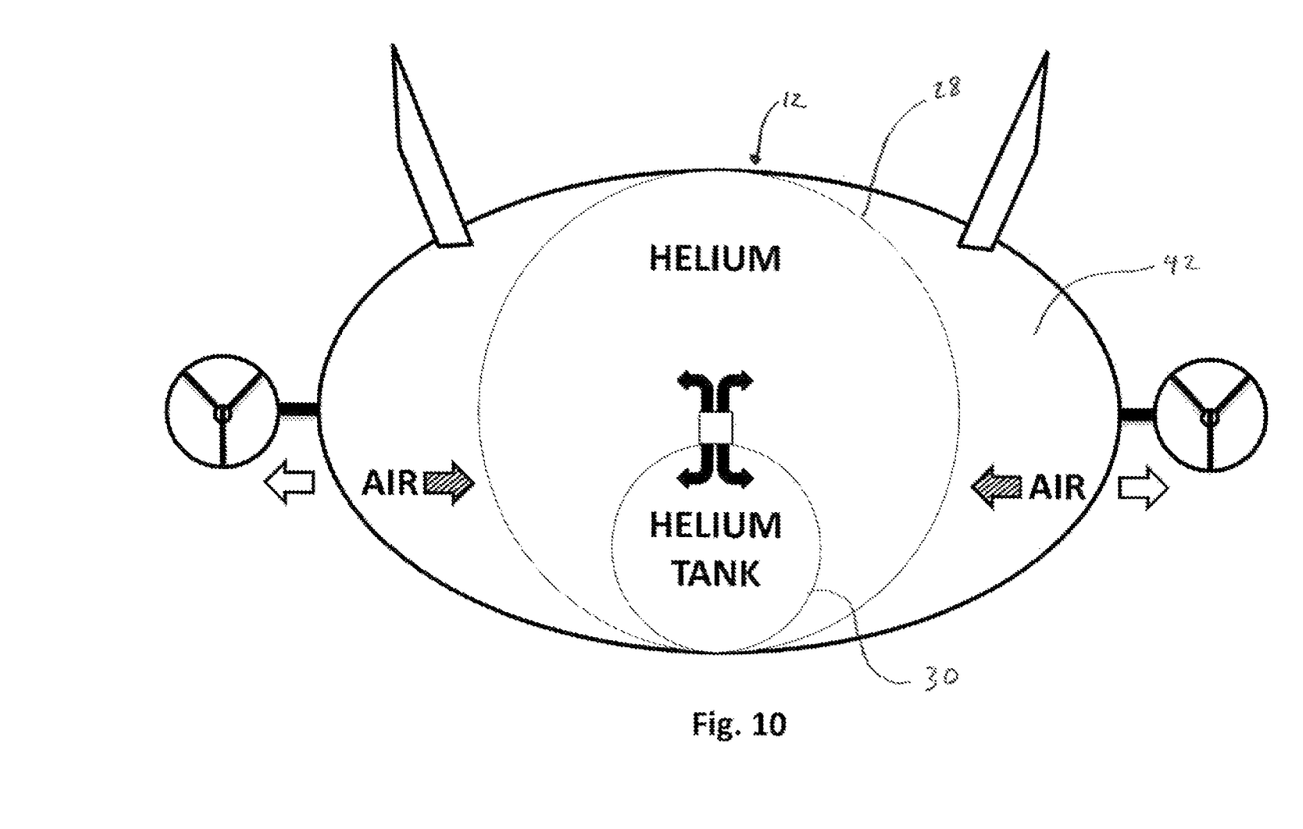
FIG. 10 is a cross section of an aircraft of the present invention showing a schematic representation of the helium compression or control of static heaviness system of the present invention aircraft.

The present invention aircraft 10 uses outside air to increase the vehicle's weight and decrease static lift. Various methods to bring in outside air can be used to increase the vehicle's weight. Referring to FIG. 10, the methods include, but are not limited to, interior expansion space 42, which may include expandable airbags 43 (not shown) housed within the hull. Outside air is allowed into the interior expansion space 42 or expandable airbags 43 inside the main envelope 28. This outside air serves as additional weight or ballast to decrease static lift during flight or for the offloading of cargo. Alternately, separate helium cells connected to pressure tanks 30 may be housed inside the vehicle as separate compartments within the hull. As helium is compressed, vents in the helium cells allow outside air to fill the spaces 42 between the helium cells and thereby increase vehicle weight and decrease static lift.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention, which do not depart from the spirit and scope of the foregoing specification and drawings, and of the claims appended below, are possible and practical. It is intended that the claims cover all such modifications and alternative embodiments.

The invention claimed is:

1. A system for compressing and releasing a lifting gas for use in an aircraft, comprising:
a power source;
a tank for the storage and release of a compressed lifting gas;
an enclosed space for the storage and release of air ballast, the enclosed space being in fluid communication with atmospheric air outside of the aircraft;
an envelope wherein the envelope, when filled with a lifting gas, provides the airship with static lift;
wherein, the tank for the storage and release of the compressed lifting gas is located within the envelope;
an inflation valve in fluid communication with the tank and the envelope;
a power transmission system for driving one or more compressors;
wherein the one or more compressors compress lifting gas from the envelope into the tank when the aircraft is ascending, and said lifting gas pressure is rising;
wherein the inflation valve releases lifting gas from the tank into the envelope when the aircraft is descending; and
wherein atmospheric air is released from, received within, or held constant within the enclosed space when the aircraft is ascending or descending, wherein a combined volume of lifting gas and air ballast is maintained constant both when the aircraft is ascending and descending.

2. The system for the compression and release of a lifting gas of claim 1, wherein the system activates to vary the volume of lifting gas to compensate for fuel burn, superheat, changing atmospheric conditions, and offloading of cargo.

3. The system for the compression and release of a lifting gas of claim 1, wherein the one or more compressors are selected from the group comprising: screw type compressors, reciprocating compressor, rotary centrifugal compressors, rotary vane compressors, and blowers.

4. The system for the compression and release of a lifting gas of claim 1, wherein the one or more compressors are capable of compressing a lifting gas to a pressure up to 250 psi.

5. The system for the compression and release of a lifting gas of claim 1, wherein the power source comprises one or more engines.

6. The system for the compression and release of a lifting gas of claim 1, wherein the power transmission system is selectively engagable to energy converters.

7. The system for the compression and release of a lifting gas of claim 1, wherein the envelope comprises one or more gas cells.

8. An aircraft comprising:
a main body, the main body being equipped with lift generating devices;
a lighter-than-air gas impermeable main envelope disposed within the main body, the main envelope containing a lighter-than-air gas;
one or more pressure tanks for storage of the lighter-than-air gas;
wherein, the one or more pressure tanks for the storage and release of the lighter-than-air gas are located within the lighter-than-air gas impermeable main envelope;
an enclosed space for the storage and release of air ballast, located within the main body, the enclosed space being in fluid communication with atmospheric air outside of the aircraft;
one or more compressors in fluid communication with the pressure tanks;
a power source for driving the one or more compressors;

one or more inflation valves in fluid communication with the one or more pressure tanks and the main envelope for releasing compressed lighter-than-air gas into the main envelope;

wherein the one or more compressors compresses the lighter-than-air gas from the main envelope in response to an ascent condition; and wherein the one or more inflation valves releases lighter-than-air gas into the main envelope in response to a descent condition; and wherein atmospheric air is released from, received within, or held constant within the enclosed space in response to the ascent condition or the descent condition, wherein a combined volume of lifting gas and ballast air within the main body is thereby maintained constant during both the ascent condition and the descent condition.

9. The aircraft of claim 8, wherein the lift generating devices include a main body in the shape of a lifting body.

10. The aircraft of claim 8, wherein the main envelope comprises one or more gas cells.

11. The aircraft of claim 8, wherein the lift generating devices include vectored thrust engines.

12. The aircraft of claim 11, further comprising a power transmission system which selectively engages one or more of the aircraft's engines to drive the compressors.

13. An aircraft comprising:
a main body;
an interior air expansion space within the main body, the interior air expansion space being in fluid communication with atmospheric air outside of the aircraft;
a lifting gas envelope disposed within the main body, the lifting gas envelope, when filled with lifting gas, providing static lift to the aircraft;
a lifting gas storage tank, disposed within the main body, the lifting gas storage tank being further located within the lifting gas envelope;
a compressor in fluid communication with the lifting gas storage tank and lifting gas envelope;
a power source for driving the compressor;
an inflation valve in fluid communication with the lifting gas storage tank and the lifting gas envelope for releasing compressed lifting gas into the lifting gas envelope;
wherein the one or more compressors compress lifting gas from the envelope into the tank when the aircraft is ascending, and said lifting gas pressure is rising, in order to maintain a combined constant volume of lifting gas and atmospheric air in the main body; and
wherein the inflation valve releases lifting gas from the tank into the envelope when the aircraft is descending in order to maintain a combined constant volume of lifting gas and atmospheric air in the main body.

14. The aircraft of claim 13, wherein the main body is equipped with lift generating devices in the shape of a lifting body.

15. The aircraft of claim 14, wherein the lift generating devices include vectored thrust engines.

16. The aircraft of claim 13, wherein the lifting gas envelope comprises one or more gas cells.

* * * * *